United States Patent [19]

Takizawa et al.

[11] Patent Number: 5,734,425
[45] Date of Patent: Mar. 31, 1998

[54] ELECTRONIC STILL CAMERA WITH REPLACEABLE DIGITAL PROCESSING PROGRAM

[75] Inventors: Yoshinori Takizawa, Kamakura; Hisahi Niwa, Suwa; Yoshito Kawagoe, Kami-Ina-Gun; Sachio Tsuge, Suwa, all of Japan

[73] Assignee: Eastman Kodak Company, Rochester, N.Y.

[21] Appl. No.: 374,448

[22] Filed: Jan. 18, 1995

[30] Foreign Application Priority Data

Feb. 15, 1994 [JP] Japan ................................. 6-018756

[51] Int. Cl.⁶ ................................................. H04N 5/225
[52] U.S. Cl. ................................. 348/231; 348/552
[58] Field of Search ........................... 348/222, 231, 348/552, 207

[56] References Cited

U.S. PATENT DOCUMENTS

| | | | |
|---|---|---|---|
| 4,853,733 | 8/1989 | Watanabe et al. | 354/412 |
| 4,855,779 | 8/1989 | Ishikawa et al. | 354/412 |
| 5,231,501 | 7/1993 | Sakai | 348/231 |
| 5,341,489 | 8/1994 | Heiberger et al. | 348/231 |
| 5,475,441 | 12/1995 | Parulski et al. | 348/552 |
| 5,477,264 | 12/1995 | Sarbadhikari et al. | 348/231 |

FOREIGN PATENT DOCUMENTS

| | | | |
|---|---|---|---|
| 2305189 | 12/1990 | Japan | H04N 5/92 |
| 5110976 | 10/1991 | Japan | H04N 5/907 |
| 3268583 | 11/1991 | Japan | H04N 5/225 |

*Primary Examiner*—Wendy Garber
*Attorney, Agent, or Firm*—David M. Woods

[57] ABSTRACT

An electronic still camera includes a digital signal processor, a digital signal processor program memory in which a digital signal program is rewritably maintained, and a communication circuit for reading external digital signal processor program data into the digital signal processor program memory. By replacing the digital signal processor program with the external digital signal processor program data, the digital processor program can be readily changed by rewriting it electrically from an external source, without having to replace or otherwise make changes to internal devices of the camera.

9 Claims, 4 Drawing Sheets

FIG. I

ELECTRONIC STILL CAMERA WITH REPLACEABLE DIGITAL PROCESSING PROGRAM

BACKGROUND OF THE INVENTION

1. Field of the Invention

The present invention relates to an electronic still camera, and more particularly to a digital signal processor (DSP) and DSP program management apparatus for processing digital image signals.

2. Description of the Prior Art

Electronic still cameras that convert an object image to digital signals and store the signals are well-known. The image formed by means of an optical system is converted to electrical signals by means such as a charge-coupled device (CCD), for example, and the signals are stored on a storage medium provided in the camera. Electronic image signals are normally processed as digital signals, and after being subjected to required image processing or compression processing these signals are stored using a solid-state storage device, hard disk or other such storage medium.

Because the image signals thus obtained can be digitally processed, an electronic still camera has various advantages compared to an ordinary optical camera. For example, the electronic images can be subjected to special processing, image data not required can be selectively erased, the storage medium can be used repeatedly, and character data or other such data processed by another computer can be readily integrated. Thus, in addition to ordinary camera functions, electronic still cameras can also be broadly applied as computer terminal devices.

To give an electronic still camera portability, the camera body houses an optical system, image processing section and storage medium, and incorporates a microcomputer to control these devices. As is well known, the overall system functions such as image acquisition, storage of image data, communication with a host computer and other such functions are controlled by the microcomputer in accordance with a microcomputer control program. This control program is incorporated in the microcomputer, or written into a separate, external program memory. Usually the program memory is a read-only memory (ROM) that retains the program data even when its electrical power is off.

Electronic still cameras have to use data compression in order to store large quantities of image data in the limited storage space with good efficiency. Edge emphasis, smoothing and other such image processes are also important for obtaining high-quality images. This image processing has usually been done in hardware, but as an electronic camera used for taking still pictures does not require very high-speed processing, it is considered that such processing can be handled by a DSP. The DSP can have an integral storage memory means for storing the image processing program or it can be connected to an external storage. This program memory also should be of a type, such as a ROM, in which the program data is retained even when its electrical power is switched off.

FIG. 5 shows the internal arrangement of a DSP 10 provided in a digital electronic still camera. The DSP 10 incorporates a control block 11, processor block 12 and DSP program ROM 13. A DSP such as DSP 10 is usually implemented as a microprocessor integrated circuit device, with the control block 11 performing the required image processing control in accordance with the DSP program stored in the DSP program ROM 13.

With this type of arrangement in which the DSP program ROM is incorporated in the DSP, any alteration in the functions or specifications of the camera has had to be effected by replacing the microprocessor that constitutes the DSP 10, which in practice has been virtually impossible. The DSP program usually has to be modified or supplemented when camera specifications are altered or when there is an upgrade to a new version. Thus, a problem with the DSP 10 has been the difficulty of changing the program.

FIG. 6 shows another circuit arrangement in which the DSP 10 is provided with an external DSP program ROM 13. The control arrangement with the DSP 10 is the same as in the arrangement of FIG. 5. The advantage of the arrangement shown in FIG. 6 is that as the DSP program ROM 13 is separated from the DSP 10, alterations to the program can be implemented by changing the DSP program ROM 13. Even in this case, however, having to change the DSP program ROM 13 is inconvenient for users and cost factors also makes it difficult, cancelling out the advantages of the electronic still camera.

An object of the present invention is to provide an improved electronic still camera in which it is very easy to electrically alter or supplement the image processing program without replacing internal devices of the camera.

SUMMARY OF THE INVENTION

In accordance with the present invention this object is attained by an electronic still camera that digitizes image data, subjects the digital data to image processing and stores the data as image data in storage medium in the camera, said camera incorporating a DSP that performs image processing on image data, a DSP program memory in which the DSP program can be rewritten, and a communication circuit for reading DSP program data into the DSP program memory from an external device.

Thus, as in accordance with this invention the DSP program memory incorporated in the electronic still camera can be rewritten and the writing-in of the program is controlled from an external apparatus via a communication circuit, it has the advantage of enabling the DSP program to be very easily altered or supplemented without making any changes to the camera body.

Further features of the invention, its nature and various advantages will become more apparent from the accompanying drawings and the following detailed description of the invention.

DESCRIPTION OF THE PREFERRED EMBODIMENTS

Figure 1:
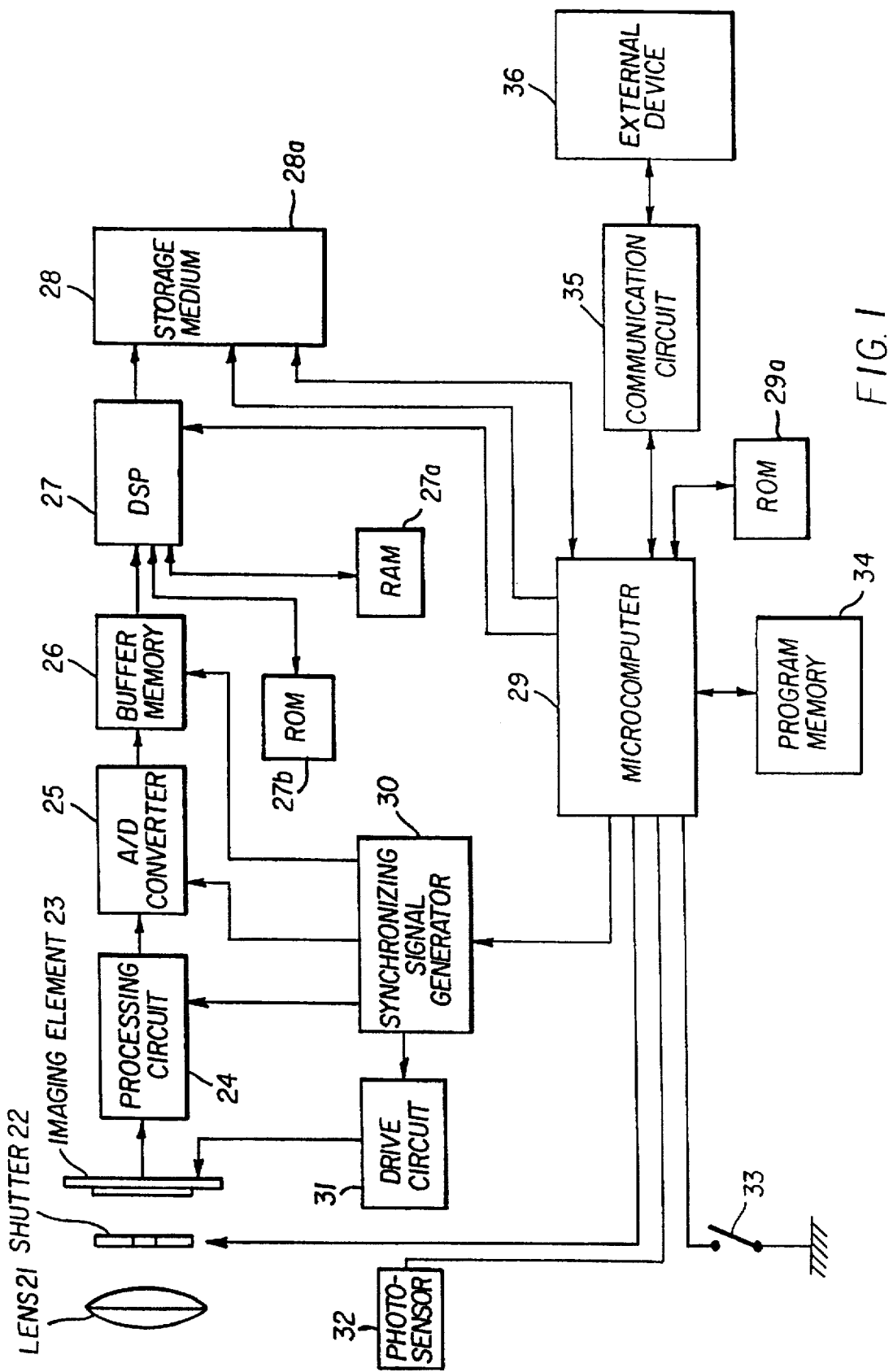
FIG. 1 is a block diagram showing a preferred first embodiment of the electronic still camera of this invention.

FIG. 1 shows a preferred first embodiment of the electronic still camera of this invention. An image of an object is formed on an imaging element 23 by an optical system that includes a lens 21 and shutter 22. The imaging element 23 is constituted by a CCD or the like, and converts image information into analog electronic signals. Electronic signals output from the imaging element 23 are input to a preprocessing circuit 24, where the signals are subjected to noise filtration, white balance adjustment, gamma correction and other preprocessing, and are then digitized by an A/D converter 25. The digitized signals are sent to a buffer memory 26, and are then passed through a DSP 27 where the data is subjected to compression, edge enhancement, smoothing and so forth, and is then stored in a storage medium 28. The storage medium 28 is a magnetic disk, RAM with data backup function, flash memory or other such storage means that retains the stored image data even when the power supply is interrupted.

In order to control the optical system, the processing circuitry and the storage medium, the electronic still camera contains a microcomputer 29 that in this embodiment directly controls the DSP 27 and storage medium 28. The microcomputer 29 also controls a synchronizing signal generator 30 that supplies the A/D converter 25 and buffer memory 26 with a prescribed synchronizing signal. This synchronizing signal is also supplied to a drive circuit 31 that reads out signals from the imaging element 23. The camera is also provided with a photosensor 32 that can measure the illuminance of the object, and there is a release switch 33 that enables the user to switch the camera on and off.

The characterizing feature of this invention is that the electronic still camera incorporates a DSP program memory 27a that holds the DSP 27 program in a rewritable form. In this embodiment the DSP program memory 27a is RAM, and provided inside the camera is a program memory 34 that can maintain at least the DSP program so the program can be rewritten. This program memory 34 is also arranged so that it retains the program data even when its electrical power supply is interrupted. A programmable ROM or the like is a suitable memory for this embodiment.

Figure 5:
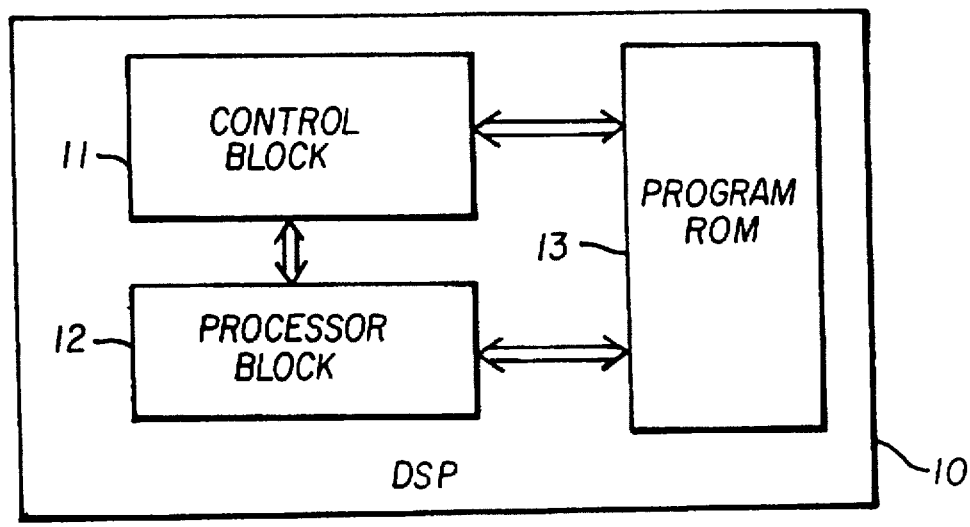
FIG. 5 is an explanatory diagram showing a microcomputer configuration that uses a ROM incorporated into the DSP.

In this embodiment the DSP program is maintained continuously within the program memory 34. When the camera is activated the DSP program is transferred from the program memory 34 to the DSP program memory 27a, where the program data does not have to maintained when system power is shut off. There is also a transfer ROM 27b connected to the DSP 27. Stored in the ROM 27b is a program for transferring to the DSP program memory 27a DSP program data received from the microcomputer 29. Depending on the size of the program, the transfer ROM 27b can be incorporated into the DSP, as shown in FIG. 5, or it can be provided externally, as in FIG. 6.

Also connected to the microcomputer 29 is a microcomputer program memory 29a. This memory 29a contains a control program that controls processing other than the image processing carried out by the DSP. As shown, the microcomputer program memory 29a is a ROM that retains data even when the electrical power is off. The microcomputer program memory 29a can be located outside the microcomputer 29, or it can be incorporated into the microcomputer 29 when the program is not particularly large. In this embodiment the electronic still camera is also provided with a communication circuit 35 that can be used as a link between the microcomputer 29 and an external device 36 such as a personal computer, for example.

The operation of the first embodiment having the above-described arrangement will now be described. The electronic still camera is activated by the user closing the release switch 33, whereby the microcomputer 29 detects the activation signal and starts camera operation. First, based on the output of the photosensor 32, the microcomputer 29 detects the brightness of the object and sets the speed of the shutter 22 and the aperture value. A well-known arrangement can be used in which the release switch 33 is interlocked with the hood of the lens 21, so that when the lens 21 is opened the shutter mechanism automatically goes into a standby mode that corresponds to the brightness of the object.

Pressing a shutter button (not shown) causes the shutter 22 to be operated by the microcomputer 29, thereby exposing the imaging element 23 to the object image. The image signals of the imaging element 23 are read out by the drive circuit 31 as a serial stream of analog signals. After image processing by the preprocessing circuit 24 these analog signals are converted to digital signals by A/D converter 25 and stored temporarily in buffer memory 26. The buffer memory 26 can usually hold one frame of data produced by a single exposure, but in order to store the data on the storage medium 28 the image data output from the buffer memory 26 is compressed by the DSP 27. After the image data has been transferred to the storage medium 28, the next exposure can be prepared. Thus, the object image is stored on the storage medium 28 in the form of electrical signals, with all the functions required to achieve this being controlled by the microcomputer 29.

Image processing is controlled by the DSP 27, with the DSP program being retained in rewritable form in the DSP program memory 27a, which is a characterizing feature of this invention. In accordance with this invention, this means that any modification or upgrade to the DSP program can be easily accomplished from the external device 36 via the communication circuit 35, by rewriting the DSP program in the DSP program memory 27a, without any physical change to the DSP 27 and DSP program memory 27a inside the camera.

The communication circuit 35 includes a driver, a receiver and other such components, and under the control of the microcomputer 29 is used to send image data from the storage medium 28 to the external device 36, or to effect remote control of the camera from the external device 36. Remote control operation is useful when the camera is being used as a monitoring camera, for example, for which pictures of the area being monitored can be acquired at prescribed intervals in the form of electronic images. In addition to the usual operations described above, the communication 25 circuit 35 can be used to readily modify or supplement the DSP program memory 27a program from the external device 36.

In this embodiment, the above program rewriting can be accomplished by having writing modifying or supplementary data from the external device 36 to the program memory 34 in accordance with a procedure predetermined by the user, such as the transmission of a write signal from the external device 36 to the microcomputer 29. However, a user can also use the camera's switches for specific operating modes. Thus, the external device 36 sends new DSP program data to the camera, this data is transferred to the microcomputer 29 by the communication circuit 35, and written to the program memory 34 by the microcomputer 29.

As described, the program memory 34 can retain the data even when the power is off. When the camera is activated for operation, the microcomputer 29 and the DSP 27, either separately or jointly, transfer the DSP program in the program memory 34 to the DSP program memory 27a in accordance with the program stored in the transfer ROM 27b. After this transfer has been completed, the camera carries out prescribed functions according to the new program.

Figure 2:
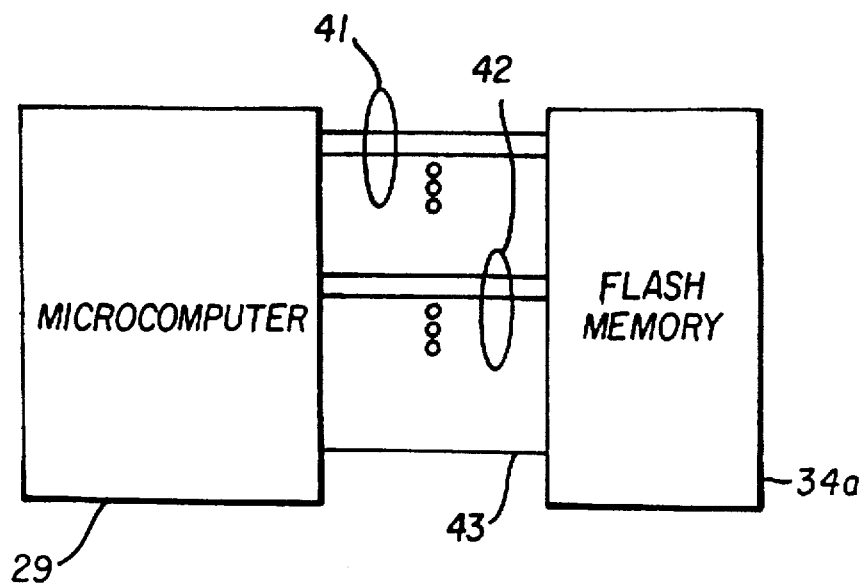
FIG. 2 is a block circuit diagram showing the relationship between the DSP and DSP program memory of the same embodiment.

FIG. 2 shows an example of the rewritable program memory configured as flash memory. The flash memory 34a is connected to microcomputer 29 by address bus 41, data bus 42 and control line 43. As the flash memory 34a retains the DSP program data even when the power is off, the microcomputer 29 can be continuously supplied with a DSP program that matches the image processing functions of the camera.

Figure 3:
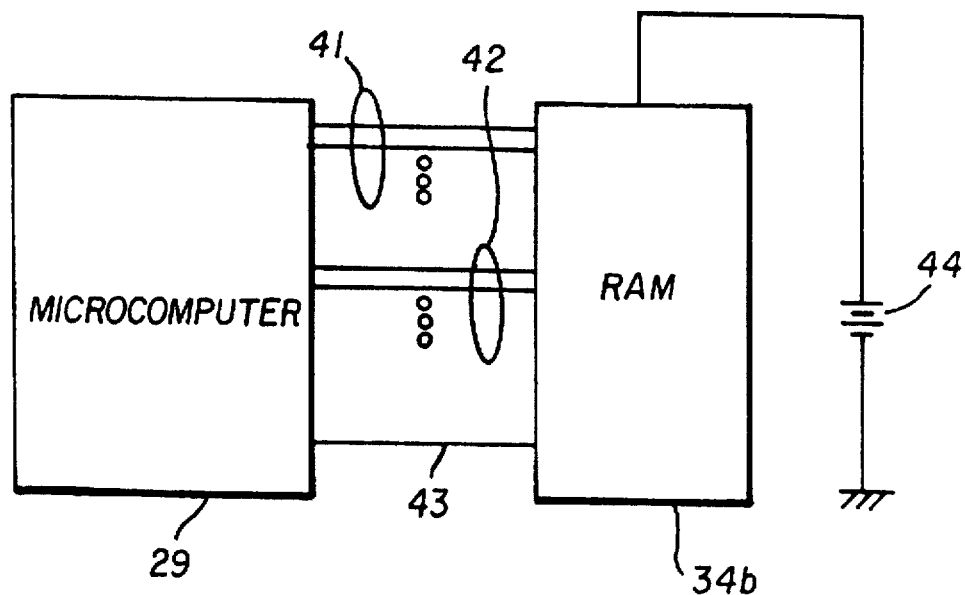
FIG. 3 is a block circuit diagram of a slightly modified version of the embodiment shown in FIG. 2.

In the arrangement shown in FIG. 3 the rewritable program memory 34 is a RAM 34b. The RAM 34b is connected to a backup battery 44 that keeps the RAM 34b supplied with operating power even if the main power is cut off, thus ensuring that the DSP program is maintained at all times.

Figure 4:
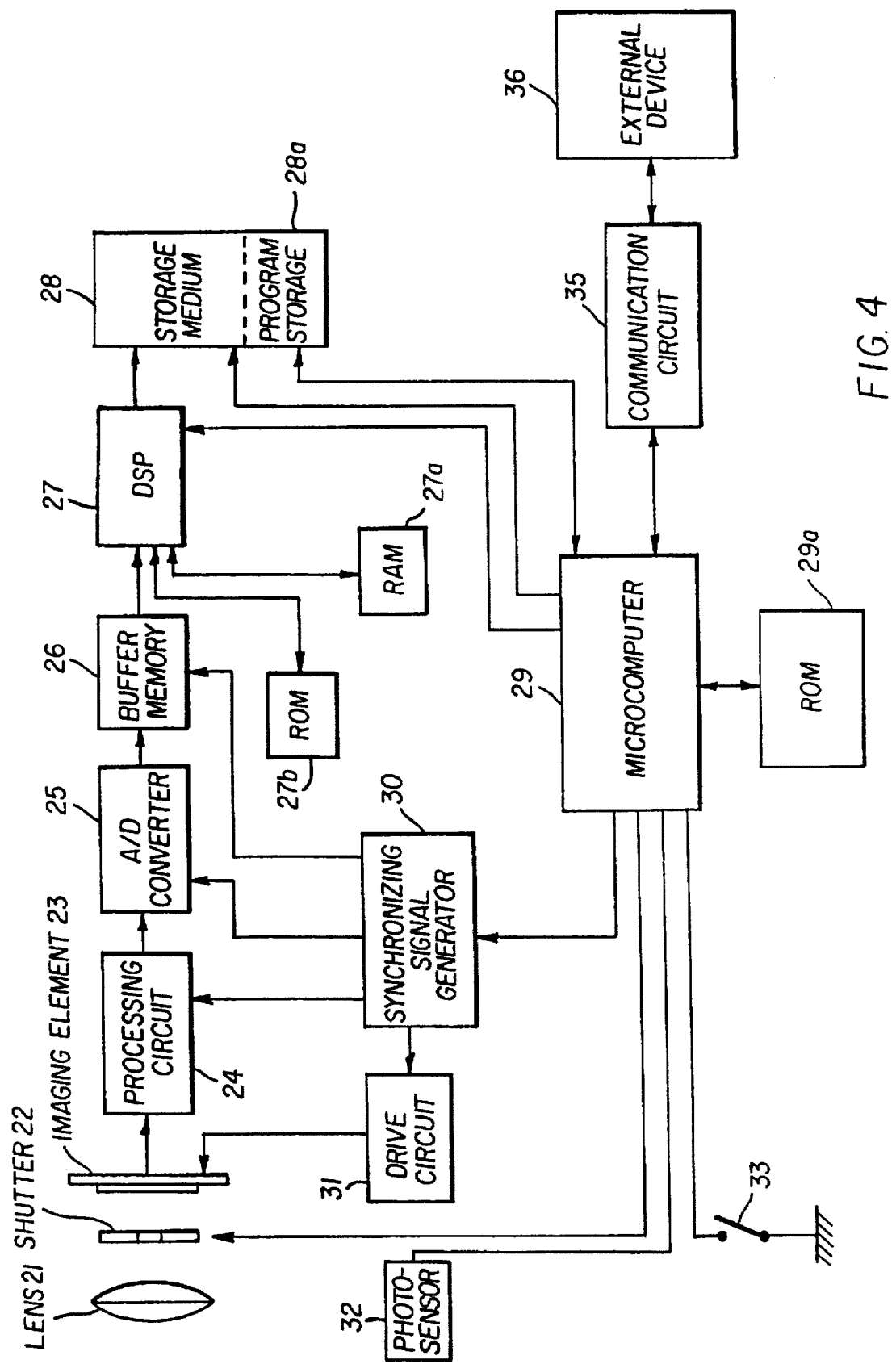
FIG. 4 is a block diagram of a second embodiment of the electronic still camera of this invention.

FIG. 4 shows a second embodiment of the electronic still camera of this invention. Parts that are the same as those in the first embodiment have been given the same reference numerals, and further description of such parts is omitted. The second embodiment is characterized by the DSP program required by the DSP 27 being maintained in the storage medium 28 used to store the image data. For this purpose, part of the storage medium 28 is used as a program storage area 28a. When the camera is activated this DSP program is transferred to the DSP program memory 27a.

More specifically, when a user uses the release switch 33 to activate the camera, in accordance with the transfer program stored in the transfer ROM 27b the DSP program data stored in the program storage area 28a of the storage medium 28 is transferred to the DSP program memory 27a by the DSP 27. Upon completion of this transfer, the same image processing described with reference to the first embodiment can be effected by the DSP 27, in accordance with the program in the DSP program memory 27a. When release switch 33 is used to switch off the camera, the DSP program data in the DSP program memory 27a is lost, and so the next time the camera is used the program data has to again be transferred from the storage medium 28.

The arrangement according to the second embodiment enables the storage medium 28 to be effectively utilized simply by providing a transfer ROM 27b that contains the data transfer program, without the rewritable program memory 27a having to be provided with a backup function.

As has been described in the foregoing, with the electronic still camera of this invention, the DSP program that controls the image processing can be readily modified or supplemented without having to replace the DSP or DSP program memory housed in the camera.

Key to Japanese in drawings:
FIG. 1

24 Preprocessing circuit
25 A/D converter
26 Buffer memory
28 Storage medium
29 Microcomputer
30 Synchronizing signal generator
31 Drive circuit
32 Photosensor
34 Program memory
35 Communication circuit
36 External device FIGS. 2 and 3

29 Microcomputer
41 Address bus
42 Data bus
43 Control line
44 Backup battery

FIG. 4

Figure 6:
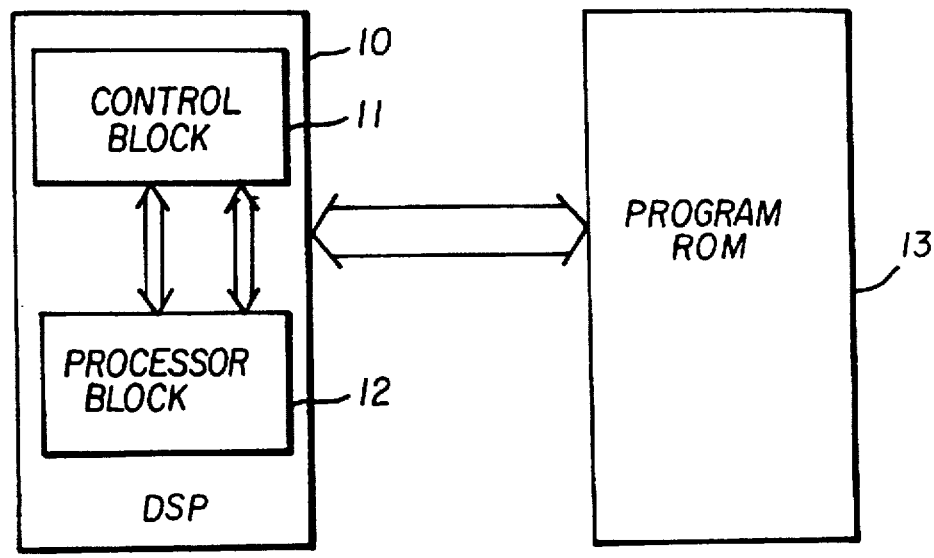
FIG. 6 is an explanatory diagram showing the relationship between the program ROM and the microcomputer used in the electronic still camera, when the ROM is incorporated into the DSP.

24 Preprocessing circuit
25 A/D converter
26 Buffer memory
28 Storage medium
28a Program area
29 Microcomputer
30 Synchronizing signal generator
31 Drive circuit
32 Photosensor
35 Communication circuit
36 External device FIGS. 5 and 6

11 Control block
12 Processor block
13 Program ROM

What is claimed is:

1. An electronic still camera that converts images to digital electronic data, subjects the digital electronic data to image processing and stores the digital electronic data as image data on a storage medium in the camera, comprising:
an imaging element for generating image data;
means for converting the image data into digital electronic data;
a digital signal processor that processes the digital electronic data so as to affect the corresponding image data;
a digital signal processor program memory in which a digital signal processor program for affecting the image data is rewritably maintained; and
a communication circuit for reading external digital signal processor program data into the digital signal processor program memory, said external digital signal processing program data replacing the digital signal processor program.

2. An electronic still camera according to claim 1, in which the camera includes a microcomputer that performs storage processing of the digital electronic data, and a program memory in which a microcomputer program is rewritably maintained,
wherein the microcomputer program memory is constituted to enable digital signal processor program data to be maintained even when an electrical power supply is interrupted, to enable the digital signal processor program data to be transferred to the digital signal processor program memory.

3. An electronic still camera according to claim 1, in which the image data storage medium includes a digital signal processor program storage area from which digital signal processor program data is transferred to digital signal processor program memory when the camera is activated.

4. An electronic still camera according to claim 3, further including a transfer ROM containing a transfer program that, when the camera is activated, transfers a digital signal processor program stored in a program area to digital signal processor program memory.

5. An electronic still camera that converts images to digital electronic data, subjects the digital electronic data to image processing and stores the digital electronic data as image data on a storage medium in the camera, comprising:

an imaging element for generating image data;

means for converting the image data into digital electronic data;

a digital signal processor that processes the digital electronic data in order to affect the image data;

a microcomputer for controlling the digital signal processor;

a digital signal processor program memory in which a digital signal processor program for affecting the image data is rewritably maintained;

a microcomputer program memory for continuously maintaining the digital signal processor program; and a communication circuit under control of the microcomputer for reading external digital signal processor program data into the microcomputer program memory in order to replace the digital signal processor program.

6. An electronic still camera according to claim 5 further including: means responsive to a camera activation signal for triggering the microcomputer to transfer the digital signal processor program from the microcomputer program memory into the digital signal processor program memory.

7. An electronic still camera that converts images to digital electronic data, subjects the digital electronic data to image processing and stores the digital electronic data as image data on a storage medium in the camera, comprising:

an imaging element for generating image data;

means for converting the image data into digital electronic data;

a digital signal processor that processes the digital electronic data in order to affect the image data;

a microcomputer for controlling the digital signal processor and the storage medium;

a digital signal processor program memory in which a digital signal processor program for affecting the image data is rewritably maintained;

a program storage area in the storage medium for continuously maintaining the digital signal processor program; and a communication circuit under control of the microcomputer for reading external digital signal processor program data into the program storage area in order to replace the digital signal processor program.

8. An electronic still camera according to claim 7 further including:

means responsive to a camera activation signal for triggering the microcomputer to transfer the digital signal processor program from the program storage area into the digital signal processor program memory.

9. An electronic still camera that converts images to digital electronic data, subjects the digital electronic data to image processing and stores the digital electronic data as image data on a storage medium in the camera, comprising:

an imaging element for generating image data;

means for converting the image data into digital electronic data;

a digital signal processor dedicated to image processing activities that processes the digital electronic data in order to affect the image data;

a microcomputer dedicated to camera control activities for controlling the digital signal processor and the storage medium;

a digital signal processor program memory in which a digital signal processor program for affecting the image data is rewritably maintained;

a microcomputer program memory for continuously maintaining the digital signal processor program;

a communication circuit under control of the microcomputer for reading external digital signal processor program data into the microcomputer program memory in order to replace the digital signal processor program; and means responsive to a camera activation signal for triggering the microcomputer to transfer the digital signal processor program from the microcomputer program memory into the digital signal processor program memory.

* * * * *

UNITED STATES PATENT AND TRADEMARK OFFICE
CERTIFICATE OF CORRECTION

PATENT NO. : 5,734,425
DATED : March 31, 1998
INVENTOR(S) : Yoshinori Takizawa, et al It is certified that error appears in the above-indentified patent and that said Letters Patent is hereby corrected as shown below:

On the title page, item [75], "Hisahi" should read --Hisashi--.

Signed and Sealed this

Seventh Day of July, 1998

Attest:

BRUCE LEHMAN

*Attesting Officer*  *Commissioner of Patents and Trademarks*